United States Patent
Yamamoto

(10) Patent No.: US 10,631,226 B2
(45) Date of Patent: Apr. 21, 2020

(54) MANAGEMENT APPARATUS AND MANAGEMENT SYSTEM FOR MANAGING COMMUNICATION BETWEEN COMMUNICATION DEVICES

(71) Applicant: SUMITOMO ELECTRIC INDUSTRIES, LTD., Osaka-shi, Osaka (JP)

(72) Inventor: Takashi Yamamoto, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/090,634

(22) PCT Filed: Dec. 16, 2016

(86) PCT No.: PCT/JP2016/087565
§ 371 (c)(1),
(2) Date: Oct. 2, 2018

(87) PCT Pub. No.: WO2017/175421
PCT Pub. Date: Oct. 12, 2017

(65) Prior Publication Data
US 2019/0116543 A1 Apr. 18, 2019

(30) Foreign Application Priority Data
Apr. 7, 2016 (JP) .................. 2016-076989

(51) Int. Cl.
*H04L 12/857* (2013.01)
*H04W 40/12* (2009.01)
(Continued)

(52) U.S. Cl.
CPC ......... *H04W 40/12* (2013.01); *H04L 47/2491* (2013.01); *H04W 52/26* (2013.01);
(Continued)

(58) Field of Classification Search
CPC . H04J 14/0284; H04W 4/005; H04W 12/009; H04W 28/021; H04W 52/26; H04L 47/2491; H04L 65/80
See application file for complete search history.

(56) References Cited

U.S. PATENT DOCUMENTS

| 2005/0003826 A1 | 1/2005 | Khitrik et al. |
| 2008/0075084 A1* | 3/2008 | Choi .................. H04L 45/00 370/392 |

(Continued)

FOREIGN PATENT DOCUMENTS

| EP | 2 584 839 A1 | 4/2013 |
| JP | 2016-010150 A | 1/2016 |

(Continued)

OTHER PUBLICATIONS

"Wikipedia" [online], [searched on Mar. 1, 2016] on the Internet <URL: http://ja.wikipedia.org/adhoc>, 4 pages, including English language translation.

*Primary Examiner* — Salvador E Rivas
(74) *Attorney, Agent, or Firm* — Faegre Drinker Biddle & Reath LLP

(57) ABSTRACT

A management device according to one mode of the present invention includes: a link information obtaining unit configured to, with respect to a plurality of communication devices capable of relaying information and capable of establishing communication connection with each other, obtain link information including communication connection relationship of each communication device and communication quality between the communication devices; a transmission information obtaining unit configured to obtain transmission information including specification information for specifying target information and required quality which is communication quality required for transmitting the target information; and a determination unit configured (Continued)

to search for a transmission path formed by the communication devices and capable of transmitting the target information while satisfying the required quality, on the basis of the link information obtained by the link information obtaining unit and the transmission information obtained by the transmission information obtaining unit.

8 Claims, 15 Drawing Sheets

(51) Int. Cl.
| | |
|---|---|
| *H04W 92/20* | (2009.01) |
| *H04W 84/18* | (2009.01) |
| *H04W 52/26* | (2009.01) |
| *H04L 12/721* | (2013.01) |
| *H04L 29/08* | (2006.01) |
| *H04L 12/741* | (2013.01) |
| *H04L 29/06* | (2006.01) |
| *H04W 4/70* | (2018.01) |
| *H04W 40/24* | (2009.01) |
| *H04W 84/22* | (2009.01) |

(52) U.S. Cl.
CPC ........... *H04W 84/18* (2013.01); *H04W 92/20* (2013.01); *H04L 45/66* (2013.01); *H04L 45/74* (2013.01); *H04L 65/80* (2013.01); *H04L 67/12* (2013.01); *H04W 4/70* (2018.02); *H04W 40/246* (2013.01); *H04W 84/22* (2013.01)

(56) References Cited

U.S. PATENT DOCUMENTS

| | | | |
|---|---|---|---|
| 2008/0298251 A1 | 12/2008 | Khuu et al. | |
| 2009/0092083 A1 | 4/2009 | Shagdar et al. | |
| 2010/0290441 A1* | 11/2010 | Stewart | H04W 40/04 370/338 |
| 2011/0280246 A1* | 11/2011 | Isozu | H04L 45/10 370/400 |
| 2015/0208318 A1* | 7/2015 | Mosko | H04W 40/04 370/310 |

FOREIGN PATENT DOCUMENTS

| | | |
|---|---|---|
| WO | WO 2007/102208 A1 | 9/2007 |
| WO | WO 2011/158431 A1 | 12/2011 |
| WO | WO-2016/132429 A1 | 8/2016 |

\* cited by examiner

Fig. 6

| APID | IP ADDRESS | THE NUMBER OF PORTS | PORT INFORMATION 402A | | | | | |
|---|---|---|---|---|---|---|---|---|
| | | | PORT NUMBER | MAC ADDRESS | PORT TYPE | INFORMATION BY PORT TYPE | | |
| 1 | a.a.a.a | 2 | 0 | 11:11:11: 11:11:11 | WIRED LAN | CONNECTION | cc:cc:cc: cc:cc:cc | COMMUNICATION SPEED 100Mbps |
| | | | 1 | 22:22:22: 22:22:22 | WIRELESS LAN AP | CONNECTION STA | 33:33:33: 33:33:33 | RADIO WAVE INTENSITY -50dBm / COMMUNICATION SPEED 54Mbps |
| | | | | | | | dd:dd:dd: dd:dd:dd | -40dBm / 54Mbps |

| APID | IP ADDRESS | THE NUMBER OF PORTS | PORT INFORMATION ||||||
|---|---|---|---|---|---|---|---|---|
| | | | PORT NUMBER | MAC ADDRESS | PORT TYPE | INFORMATION BY PORT TYPE ||| SCAN INFORMATION |
| | | | | | | CONNECTION DESTINATION AP BSSID / CONNECTION STA | RADIO WAVE INTENSITY | COMMUNICATION SPEED | |
| 2 | b.b.b.b | 2 | 0 | 33:33:33: 33:33:33 | WIRELESS LAN STA | 22:22:22: 22:22:22 | −50dBm | 54Mbps | |
| | | | 1 | 44:44:44: 44:44:44 | WIRELESS LAN AP | 55:55:55: 55:55:55 | −80dBm | 6Mbps | |
| | | | | | | aa:aa:aa: aa:aa:aa | −40dBm | 54Mbps | |

Fig. 8

| APID | IP ADDRESS | THE NUMBER OF PORTS | PORT INFORMATION 402C | | | | | | | |
|---|---|---|---|---|---|---|---|---|---|---|
| | | | PORT NUMBER | MAC ADDRESS | PORT TYPE | INFORMATION BY PORT TYPE | | | SCAN INFORMATION | |
| | | | | | | CONNECTION DESTINATION AP BSSID / CONNECTION STA | RADIO WAVE INTENSITY | COMMUNI CATION SPEED | AP BSSID | RADIO WAVE INTENSITY |
| 3 | c.c.c.c | 2 | 0 | 55:55:55: 55:55:55 | WIRELESS LAN STA | 44:44:44: 44:44:44 | −80dBm | 6Mbps | 22:22:22: 22:22:22 | −80dBm |
| | | | 1 | 66:66:66: 66:66:66 | WIRELESS LAN AP | bb:bb:bb: bb:bb:bb | −40dBm | 54Mbps | | |

Fig. 9

| ID | ETHERNET TYPE | IP PROTOCOL | TRANS-MISSION-DESTI-NATION IP ADDRESS | TRANS-MISSION-SOURCE IP ADDRESS | TRANS-MISSION-DESTI-NATION UDP PORT NUMBER | TRANS-MISSION-SOURCE UDP PORT NUMBER | TRANS-MISSION-DESTI-NATION TCP PORT NUMBER | TRANS-MISSION-SOURCE TCP PORT NUMBER | PRIORITY | MAXIMUM COMMUNI-CATION SPEED | MINIMUM COMMUNI-CATION SPEED | ALLOWABLE DELAY AMOUNT |
|---|---|---|---|---|---|---|---|---|---|---|---|---|
| 1 | 0x0800 (IP) | 6 (TCP) | z.z.z.z | y.y.y.y | | | BB | YY | 1 | 10Mbps | 10Mbps | 200ms |
| 2 | 0x0800 (IP) | 17 (UDP) | z.z.z.z | x.x.x.x | AA | XX | | | 2 | 100kbps | 100kbps | 100ms |

| APID | PORT NUMBER | ETHERNET TYPE | IP PROTOCOL | TRANSMISSION-DESTINATION IP ADDRESS | TRANSMISSION-SOURCE IP ADDRESS | TRANSMISSION-DESTINATION UDP PORT NUMBER | TRANSMISSION-SOURCE UDP PORT NUMBER | TRANSMISSION-DESTINATION TCP PORT NUMBER | TRANSMISSION-SOURCE TCP PORT NUMBER |
|---|---|---|---|---|---|---|---|---|---|
| 2 | 1 | 0x0800 (IP) | 17 | z.z.z.z | x.x.x.x | AA | XX | | |

| APID | PORT NUMBER | ETHERNET TYPE | IP PROTOCOL | TRANSMISSION-DESTINATION IP ADDRESS | TRANSMISSION-SOURCE IP ADDRESS | TRANSMISSION-DESTINATION UDP PORT NUMBER | TRANSMISSION-SOURCE UDP PORT NUMBER | TRANSMISSION-DESTINATION TCP PORT NUMBER | TRANSMISSION-SOURCE TCP PORT NUMBER |
|---|---|---|---|---|---|---|---|---|---|
| 3 | 1 | 0x0800 (IP) | 6 | y.y.y.y | z.z.z.z | | | BB | YY |

| APID | ETHERNET TYPE | IP PROTOCOL | TRANS- MISSION- DESTI- NATION IP ADDRESS | TRANS- MISSION- SOURCE IP ADDRESS | TRANS- MISSION- DESTI- NATION UDP PORT NUMBER | TRANS- MISSION- SOURCE UDP PORT NUMBER | TRANS- MISSION- DESTI- NATION TCP PORT NUMBER | TRANS- MISSION- SOURCE TCP PORT NUMBER | SWITCH PROCESSING CONTENT |
|---|---|---|---|---|---|---|---|---|---|
| 2 | 0x0800 (IP) | 17 | a.a.a.a | x.x.x.x | AA | XX | | | REWRITE TRANSMISSION-SOURCE MAC ADDRESS OF RECEIVED PACKET TO 33:33:33:33:33:33. REWRITE TRANSMISSION-DESTINATION MAC ADDRESS OF RECEIVED PACKET TO 22:22:22:22:22:22. TRANSMIT REWRITTEN PACKET FROM PORT HAVING PORT NUMBER 0. |

| APID | ETHERNET TYPE | IP PROTOCOL | TRANSMISSION-DESTINATION IP ADDRESS | TRANSMISSION-SOURCE IP ADDRESS | TRANSMISSION-DESTINATION UDP PORT NUMBER | TRANSMISSION-SOURCE UDP PORT NUMBER | TRANSMISSION-DESTINATION TCP PORT NUMBER | TRANSMISSION-SOURCE TCP PORT NUMBER | SWITCH PROCESSING CONTENT |
|---|---|---|---|---|---|---|---|---|---|
| 1 | 0x0800 (IP) | 17 | a.a.a.a | x.x.x.x | AA | xx | | | REWRITE TRANSMISSION-SOURCE MAC ADDRESS OF RECEIVED PACKET TO 11:11:11:11:11:11. REWRITE TRANSMISSION-DESTINATION MAC ADDRESS OF RECEIVED PACKET TO cc:cc:cc:cc:cc:cc. TRANSMIT REWRITTEN PACKET FROM PORT HAVING PORT NUMBER 0. |

| APPLICATION ID | STATE | CAUSE | COUNTERMEASURE |
|---|---|---|---|
| 1 | ABNORMAL | INSUFFICIENT COMMUNICATION BAND | PROVIDE NEW AP151 BETWEEN AP151A (AP ID=1) AND AP151B (AP ID=2). |
| 2 | NORMAL | | |

405

MANAGEMENT APPARATUS AND MANAGEMENT SYSTEM FOR MANAGING COMMUNICATION BETWEEN COMMUNICATION DEVICES

TECHNICAL FIELD

The present invention relates to a management device and a management system, and in particular, relates to a management device and a management system which manage communication.

The present application claims priority based on Japanese Patent Application No. 2016-076989 filed on Apr. 7, 2016, the entire contents of which are incorporated herein by reference.

BACKGROUND ART

"Wikipedia" [online], [searched on Mar. 1, 2016] on the Internet <URL:http://ja.wikipedia.org/ad hoc> (NON PATENT LITERATURE 1) describes a wireless ad hoc network. That is, in mobile communication used in mobile phones and the like, wireless base station devices and infrastructures such as fixed networks that connect wireless base station devices are indispensable. Meanwhile, in a wireless ad hoc network, each wireless terminal device autonomously performs routing to perform multi-hop communication. The wireless ad hoc network does not require a fixed network, and essentially, does not require such infrastructures. Therefore, simply by distributing wireless terminal devices in an environment in which to construct a network, and providing a state where the wireless terminal devices gather, the network can be constructed immediately.

CITATION LIST

Non Patent Literature

NON PATENT LITERATURE 1: "Wikipedia", [online], [searched on Mar. 1, 2016] on the Internet <URL:http://ja.wikipedia.org/ad hoc>

SUMMARY OF INVENTION (1) A management device according to an aspect of the present disclosure includes: a link information obtaining unit configured to, with respect to a plurality of communication devices capable of relaying information and capable of establishing communication connection with each other, obtain link information including communication connection relationship of each communication device and communication quality between the communication devices; a transmission information obtaining unit configured to obtain transmission information including specification information for specifying target information and required quality which is communication quality required for transmitting the target information; and a determination unit configured to search for a transmission path formed by the communication devices and capable of transmitting the target information while satisfying the required quality, on the basis of the link information obtained by the link information obtaining unit and the transmission information obtained by the transmission information obtaining unit.

(10) A management system according to an aspect of the present disclosure includes: a plurality of communication devices capable of relaying information and capable of establishing communication connection with each other; and a management device, wherein with respect to the plurality of communication devices, the management device obtains link information including communication connection relationship of each communication device and communication quality between the communication devices, the management device obtains transmission information including specification information for specifying target information and required quality which is communication quality required for transmitting the target information, and the management device searches for a transmission path formed by the communication devices and capable of transmitting the target information while satisfying the required quality, on the basis of the link information and the transmission information that have been obtained.

The present invention can be realized as a semiconductor integrated circuit that functions as part or the entire management device including such characteristic processing units, can be realized as a method including steps of such characteristic processes, or can be realized as a program for causing a computer to execute such steps.

The present invention can be realized as a semiconductor integrated circuit that functions as part or the entire management system including such characteristic processing units, can be realized as a method including steps of such characteristic processes, or can be realized as a program for causing a computer to execute such steps.

BRIEF DESCRIPTION OF DRAWINGS

FIG. 6 is a diagram showing one example of link information to be registered in the management device in the management system according to the embodiment of the present invention.

FIG. 7 is a diagram showing one example of the link information to be registered in the management device in the management system according to the embodiment of the present invention.

FIG. 8 is a diagram showing one example of the link information to be registered in the management device in the management system according to the embodiment of the present invention.

FIG. 9 is a diagram showing one example of transmission information to be registered in the management device in the management system according to the embodiment of the present invention.

FIG. 10 is a diagram showing one example of reception application information to be transmitted from an AP to the management device in the management system according to the embodiment of the present invention.

FIG. 11 is a diagram showing one example of the reception application information to be transmitted from an AP to the management device in the management system according to the embodiment of the present invention.

FIG. 12 is a diagram showing one example of control information to be transmitted from the management device to an AP in the management system according to the embodiment of the present invention.

FIG. 13 is a diagram showing one example of the control information to be transmitted from the management device to an AP in the management system according to the embodiment of the present invention.

FIG. 14 is a diagram showing one example of report information generated by a determination unit in the management device according to the embodiment of the present invention.

DESCRIPTION OF EMBODIMENTS

Figure 1:
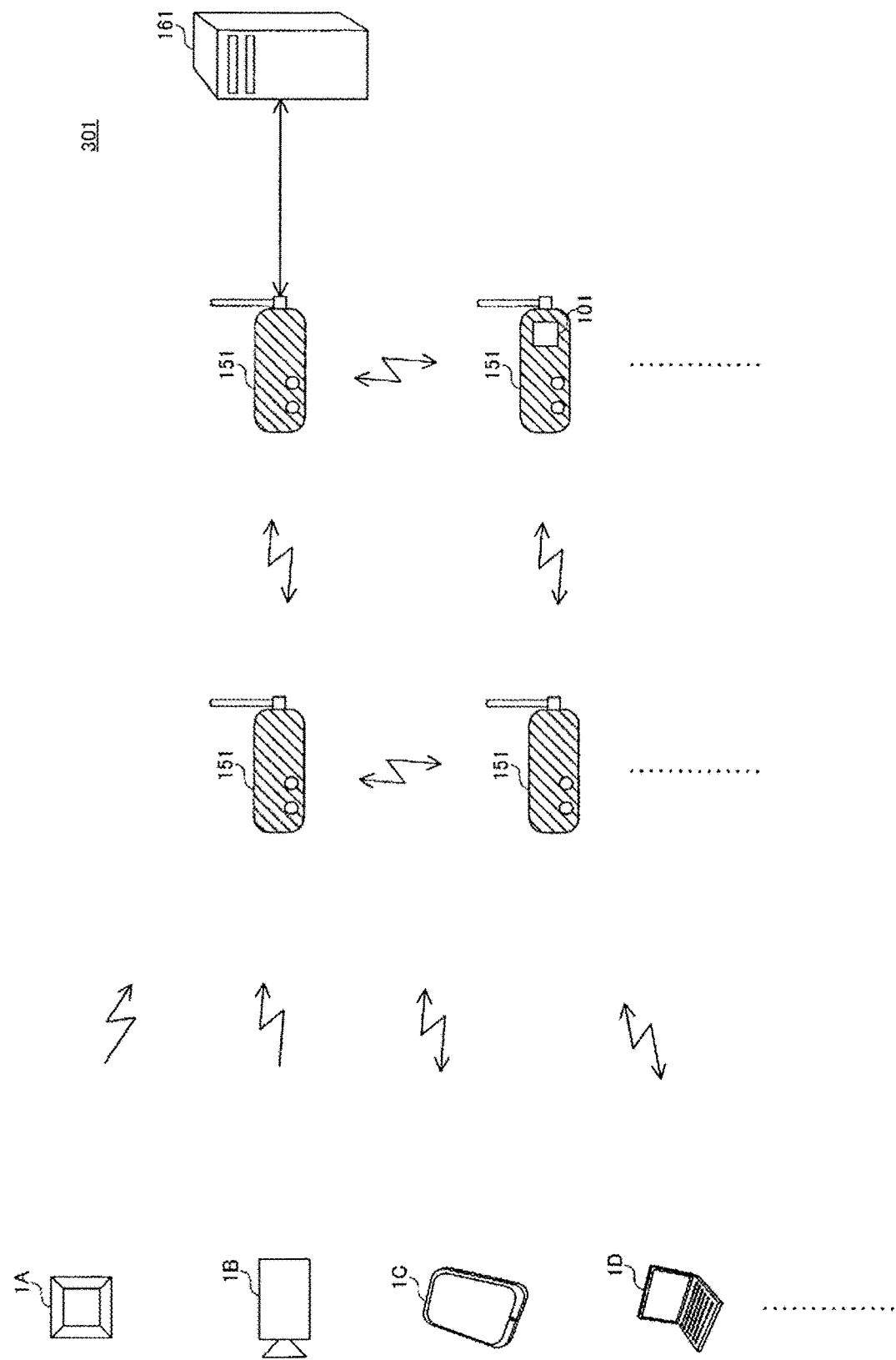
FIG. 1 is a diagram showing a configuration of a management system according to an embodiment of the present invention.

<Problems to be Solved by the Present Disclosure>

In a case where a packet is sent/received to/from communication devices via a wireless ad hoc network, the packet is transmitted among communication devices though a transmission path via one or a plurality of wireless terminal devices which relay the packet.

Such multi-hop communication is used not only in a wireless ad hoc network but also in a wired network, and is often used by a single application such as a smart meter for measuring electric power, for example.

In contrast to this, an M2M (machine to machine) system expected to be increasingly used in the future is realized in a combination of various applications having different required communication qualities such as in: transmission of high frequency waves such as sound, vibration, voltage, current, and magnetic field; delivery of images and moving pictures; transmission and analysis of bulk data accumulated in the past; and real-time control.

In a case where various applications, such as in an M2M system, uses multi-hop communication, the communication quality required by the applications is not ensured in some cases due to traffic concentration. In such a case, communication by the applications is not realized in good quality, which is not preferable. There is a demand for a technology that more reliably ensures the communication quality required by each application, by managing each communication device.

The present disclosure has been made in order to solve the above problem. An object of the present disclosure is to provide a management device and a management system that can more reliably ensure good communication quality in a configuration in which information is transmitted via a plurality of communication devices.

<Effects of the Present Disclosure>

According to the present disclosure, in a configuration in which information is transmitted via a plurality of communication devices, good communication quality can be more reliably ensured.

<Outline of the Embodiment of the Present Invention>

Hereinafter, the outline of the embodiment of the present invention is described.

(1) A management device according to an embodiment of the present invention includes: a link information obtaining unit configured to, with respect to a plurality of communication devices capable of relaying information and capable of establishing communication connection with each other, obtain link information including communication connection relationship of each communication device and communication quality between the communication devices; a transmission information obtaining unit configured to obtain transmission information including specification information for specifying target information and required quality which is communication quality required for transmitting the target information; and a determination unit configured to search for a transmission path formed by the communication devices and capable of transmitting the target information while satisfying the required quality, on the basis of the link information obtained by the link information obtaining unit and the transmission information obtained by the transmission information obtaining unit.

With this configuration, since the connection state of each communication device can be properly recognized on the basis of the link information, a transmission path that allows more reliable transmission of the target information can be properly searched for. Accordingly, when it has been determined that the communication quality required by an application can be ensured, the target information can be transmitted in good quality by use of the transmission path, and when it has been determined that the communication quality required by the application cannot be ensured, it is possible to take measures that can ensure the communication quality required by the application. Thus, in a configuration in which information is transmitted via a plurality of communication devices, good communication quality can be more reliably ensured.

(2) Preferably, the management device further includes: a notification unit configured to, when the determination unit has determined that the transmission path exists, notify the communication devices forming the transmission path of a communication device that should be used as a next transmission destination for the target information.

With this configuration, the next transmission destination for the target information can be set in each communication device, and thus, the target information can be transmitted along the transmission path determined by the management device. Since the next transmission destination for information other than the target information is not set in each communication device, information other than the target information can be prevented from being transmitted. Accordingly, security in the transmission system formed by the communication devices can be improved.

(3) More preferably, the notification unit notifies the communication devices in an order reverse to an order in which the target information is to be transmitted in the transmission path.

With this configuration, in the communication device that is to serve as the transmission destination for the target information with respect to the communication device that has received the notification, the setting as the transmission destination has already been made. Thus, the target information transmitted by the communication device that has received the notification can be prevented from being delayed at the communication device serving as the transmission destination for the target information. That is, the target information can be smoothly transmitted along the transmission path.

(4) Preferably, the management device further includes a notification unit configured to, when the determination unit has determined that the transmission path does not exist, make a notification so as to allow recognition of the fact that the transmission path does not exist.

With this configuration, for example, the administrator can recognize that the transmission path does not exist, and thus, can take measures that can ensure the communication quality required by the application.

(5) More preferably, the notification unit makes a notification regarding a space between the communication devices that does not satisfy the required quality.

With this configuration, for example, the administrator can easily identify the position at which to take measures that can ensure the communication quality required by an application.

(6) Preferably, the specification information includes information capable of specifying a transmission destination and a transmission source for the target information.

With this configuration, among the communication devices, the communication device that receives the target information first and the communication device that transmits the target information last can be specified. Thus, on the basis of the specified communication devices, the transmission path can be appropriately searched for.

(7) More preferably, the link information includes: information capable of specifying a port of a communication device; and information capable of specifying a communication device as a connection destination via the port, and the notification unit makes a notification of the port from which the target information should be outputted.

With this configuration, it is possible to specify the port of which connection destination is the communication device that should be used as the next transmission destination for the target information. Thus, by notifying the specified port, the next transmission destination for the target information can be set in a simple manner.

(8) More preferably, the link information further includes the kind of communication method that corresponds to the port.

With this configuration, a port having a communication method suitable for transmitting the target information can be specified, and thus, a more suitable transmission path can be searched for.

(9) Preferably, the management device further includes a notification unit configured to notify each communication device of instruction information based on the transmission information obtained by the transmission information obtaining unit, wherein the communication device determines, by use of the instruction information, whether information received from another device is the target information, and when the determination unit has been notified by the communication device that the target information had been received, the determination unit searches for the transmission path.

With this configuration, the search for the transmission path can be performed at a suitable timing when the target information has been transmitted. Thus, compared with a case where the search for the transmission path is performed in a state where whether to perform transmission of the target information is uncertain before the transmission of the target information is performed, or in a state where the communication connection relationship of each communication device changes, the possibility of wasting the searching process can be reduced.

(10) A management system according to the embodiment of the present invention includes: a plurality of communication devices capable of relaying information and capable of establishing communication connection with each other; and a management device, wherein with respect to the plurality of communication devices, the management device obtains link information including communication connection relationship of each communication device and communication quality between the communication devices, the management device obtains transmission information including specification information for specifying target information and required quality which is communication quality required for transmitting the target information, and the management device searches for a transmission path formed by the communication devices and capable of transmitting the target information while satisfying the required quality, on the basis of the link information and the transmission information that have been obtained.

With this configuration, since the connection state of each communication device can be properly recognized on the basis of the link information, a transmission path that allows more reliable transmission of the target information can be properly searched for. Accordingly, when it has been determined that the communication quality required by an application can be ensured, the target information can be transmitted in good quality by use of the transmission path, and when it has been determined that the communication quality required by the application cannot be ensured, it is possible to take measures that can ensure the communication quality required by the application. Thus, in a configuration in which information is transmitted via a plurality of communication devices, good communication quality can be more reliably ensured.

<Details of Embodiment of the Present Invention>

Hereinafter, embodiments of the present invention will be described with reference to the drawings. In the drawings, the same or corresponding parts are denoted by the same reference signs, and descriptions thereof are not repeated. At least some parts of the embodiments described below can be combined together as desired.

[Configuration and Basic Operation]

FIG. 1 is a diagram showing a configuration of a management system according to an embodiment of the present invention.

With reference to FIG. 1, a management system 301 includes: a plurality of access points (communication devices) (hereinafter, also referred to as AP) 151; and a management device 101.

In the management system 301, the plurality of APs 151 relay information communicated between devices among application devices 1A to 1D and a server 161. In this example, the application devices 1A, 1B, 1C, and 1D are a sensor, a camera, a tablet, and a PC (personal computer), respectively. Hereinafter, each of the application devices 1A to 1D is also referred to as an application device 1. Each application device 1 may be a device such as a smart phone or a data storage, other than the devices mentioned above.

The communication between the application device 1 and an AP 151 is performed in the form of wireless communication, for example. This communication may be performed in the form of wired communication.

The communication between the server 161 and an AP 151 is performed in the form of wired communication, for example. This communication may be performed in the form of wireless communication.

The management device 101 is provided in the inside of one of the APs 151. Not limited to the configuration in which the management device 101 is provided inside an AP 151, a configuration in which the management device 101 is provided outside an AP 151 may be employed. The management device 101 can perform communication with each AP 151.

The communication between APs 151 is performed in the form of wireless multi-hop communication. Each AP 151 has already established communication connection with the management device, and can transmit/receive information to/from the management device 101.

For example, in a case where the management system 301 is used in an M2M system, the plurality of APs 151 relay sensor information indicative of a measurement result obtained by the application device 1A which is a sensor, and image information indicative of an image captured by the application device 1B which is a camera, thereby transmitting the sensor information and the image information to the server 161.

The plurality of APs 151 relay an analysis result of sensor information by the server 161 and image information accumulated in the server 161, thereby transmitting the analysis result and the accumulated image information to the application device 1C, 1D.

Figure 2:
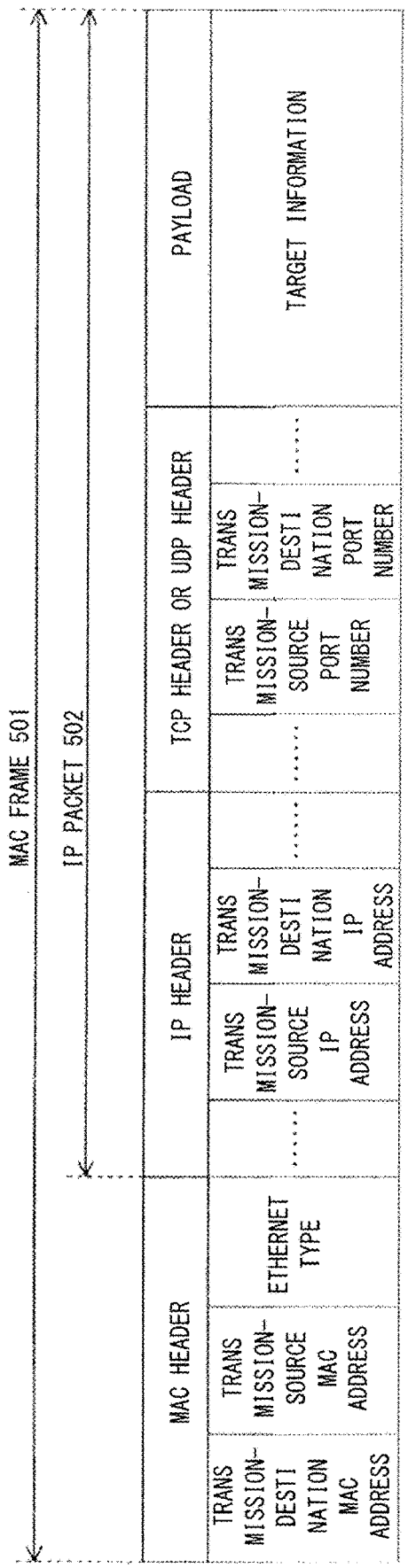
FIG. 2 is a diagram showing one example of the format of a MAC frame to be used in the management system according to the embodiment of the present invention.

FIG. 2 is a diagram showing one example of the format of a MAC frame used in the management system according to the embodiment of the present invention.

With reference to FIG. 2, a MAC (media access control) frame 501 includes: a MAC header; and a MAC payload in which an IP (internet protocol) packet 502 is stored.

In the MAC header, a transmission-destination MAC address, a transmission-source MAC address, and an Ethernet (registered trade mark) type are stored. The value of the Ethernet type is, for example, 0x0806 which indicates that the MAC frame 501 is to be used in an ARP (address resolution protocol), 0x0800 which indicates that the MAC frame 501 is to be used in transmission of the IP packet 502, or the like. Hereinafter, a digit starting with "0x" means that the digits after "0x" are expressed by hexadecimal numbers.

The IP packet 502 includes: an IP header; a TCP (transmission control protocol) header or a UDP (user datagram protocol) header; and a payload. The area obtained by combining the TCP header or UDP header, and the payload corresponds to the payload of the IP packet 502.

In the IP header, a transmission-source IP address and a transmission-destination IP address are stored. In the TCP header or the UDP header, a transmission-source port number and a transmission-destination port number are stored. In the payload, part or the entire target information is stored, for example. Thus, the target information is information (user data) that is stored in the payload of the packet.

Figure 3:
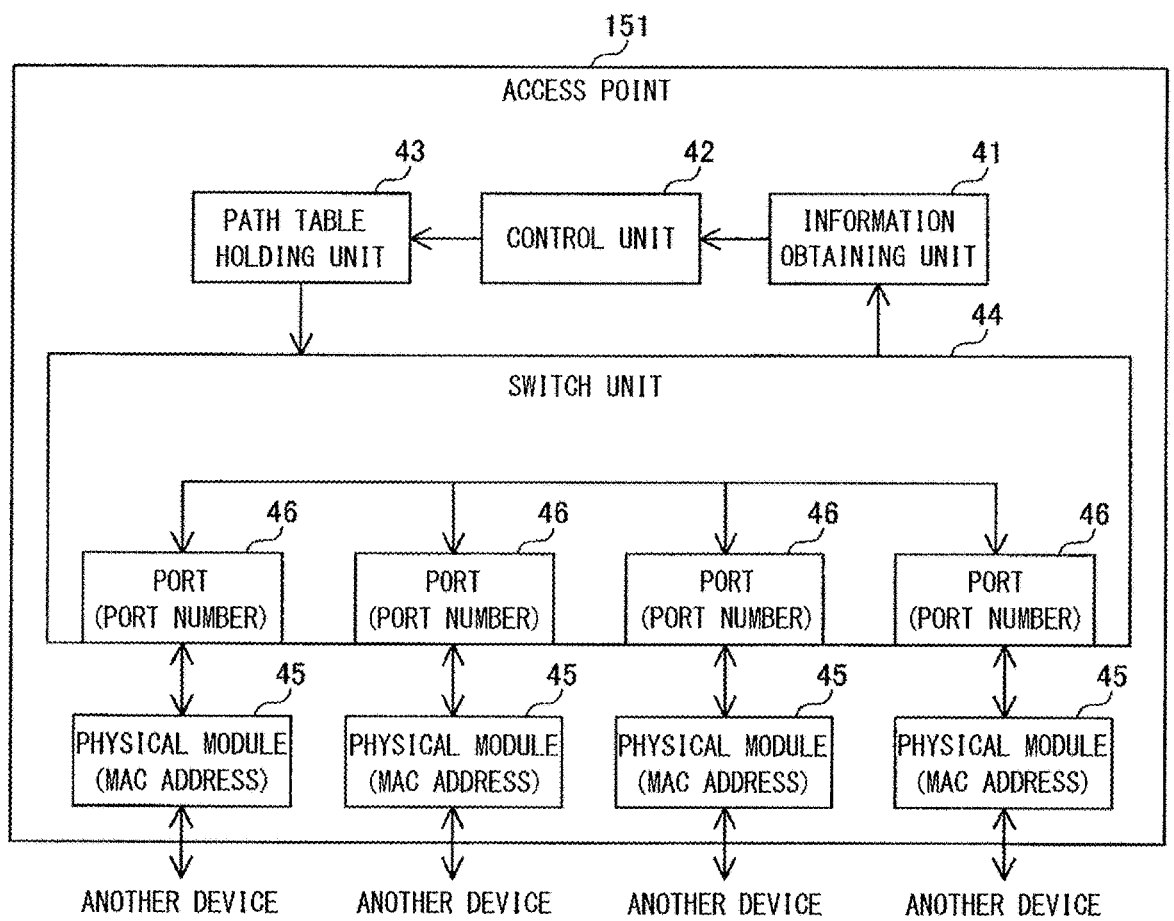
FIG. 3 is a diagram showing a configuration of an access point in the management system according to the embodiment of the present invention.

FIG. 3 is a diagram showing a configuration of an access point in the management system according to the embodiment of the present invention.

With reference to FIG. 3, each AP 151 includes an information obtaining unit 41, a control unit 42, a path table holding unit 43, a switch unit 44, and four physical modules 45. The switch unit 44 includes four ports 46.

The obtaining unit 41, the control unit 42, and the holding unit 43 are each implemented by a processor which performs digital signal processing, such as a CPU (central processing unit) or an MPU (micro-processing unit), for example. These units may be implemented as one processor, or may be implemented as separate processors.

The physical modules 45 are provided so as to correspond to the ports 46, respectively. FIG. 3 shows four sets of a physical module 45 and a corresponding port 46 as a representative example, but one, two, three, five, or more of such sets may be provided.

The APs 151 can relay information, and can establish communication connection with each other.

More specifically, each physical module 45 in each AP 151 is a communication circuit that can operate as a wireless LAN AP (local area network access point) as a base station, a wired LAN or a wireless LAN STA (station) as a terminal, or the like, and has a unique MAC address.

Each physical module 45 can establish communication connection with a physical module 45 of another AP 151. Each port 46 has a unique port number.

The path table holding unit 43 holds, for each target information, a path table indicative of the correspondence relationship between: the MAC address of the transmission-source device; and the MAC address of the transmission-destination device and the port number of the port 46 from which to output the target information. Here, the target information is specified by later-described specification information included in the MAC frame 501. Part or the entire transmission path for the MAC frame 501 is formed by the transmission-source device, the AP 151 itself, and the transmission-destination device.

When the switch unit 44 has received a MAC frame 501 via a set of a port 46 and a physical module 45, and if the transmission-destination MAC address included in the received MAC frame 501 matches the MAC address of the physical module 45, the switch unit 44 performs the following process.

That is, the switch unit 44 specifies the target information on the basis of the specification information included in the MAC frame 501. Then, the switch unit 44 refers to a path table that corresponds to the specified target information among path tables held by the path table holding unit 43, and obtains the port number of the port 46 from which to output the target information and the MAC address of the transmission-destination device that corresponds to the transmission-source MAC address included in the received MAC frame 501.

Then, the switch unit 44 rewrites the transmission-destination MAC address in the MAC frame 501, to the obtained MAC address of the transmission-destination device. In addition, the switch unit 44 rewrites the transmission-source MAC address in the MAC frame 501, to the MAC address of the physical module 45 that corresponds to the port 46 having the obtained port number.

The switch unit 44 transmits the MAC frame 501 having the rewritten transmission-destination MAC address and the rewritten transmission-source MAC address, from the port 46 having the obtained port number, to the transmission-destination device.

When the information obtaining unit 41 has received later-described control information including the switch processing content from the management device 101 via a physical module 45 and the switch unit 44, the information obtaining unit 41 outputs the received control information to the control unit 42.

When the control unit 42 has received the control information from the information obtaining unit 41, the control unit 42 rewrites a path table held by the path table holding unit 43, in accordance with the received control information.

Thus, through the configuration in which the path table is updated in accordance with control information transmitted from the management device 101, the management device 101 can set a transmission path for the target information.

[Specific Example of Electric Power Consumption Management System]

Figure 4:
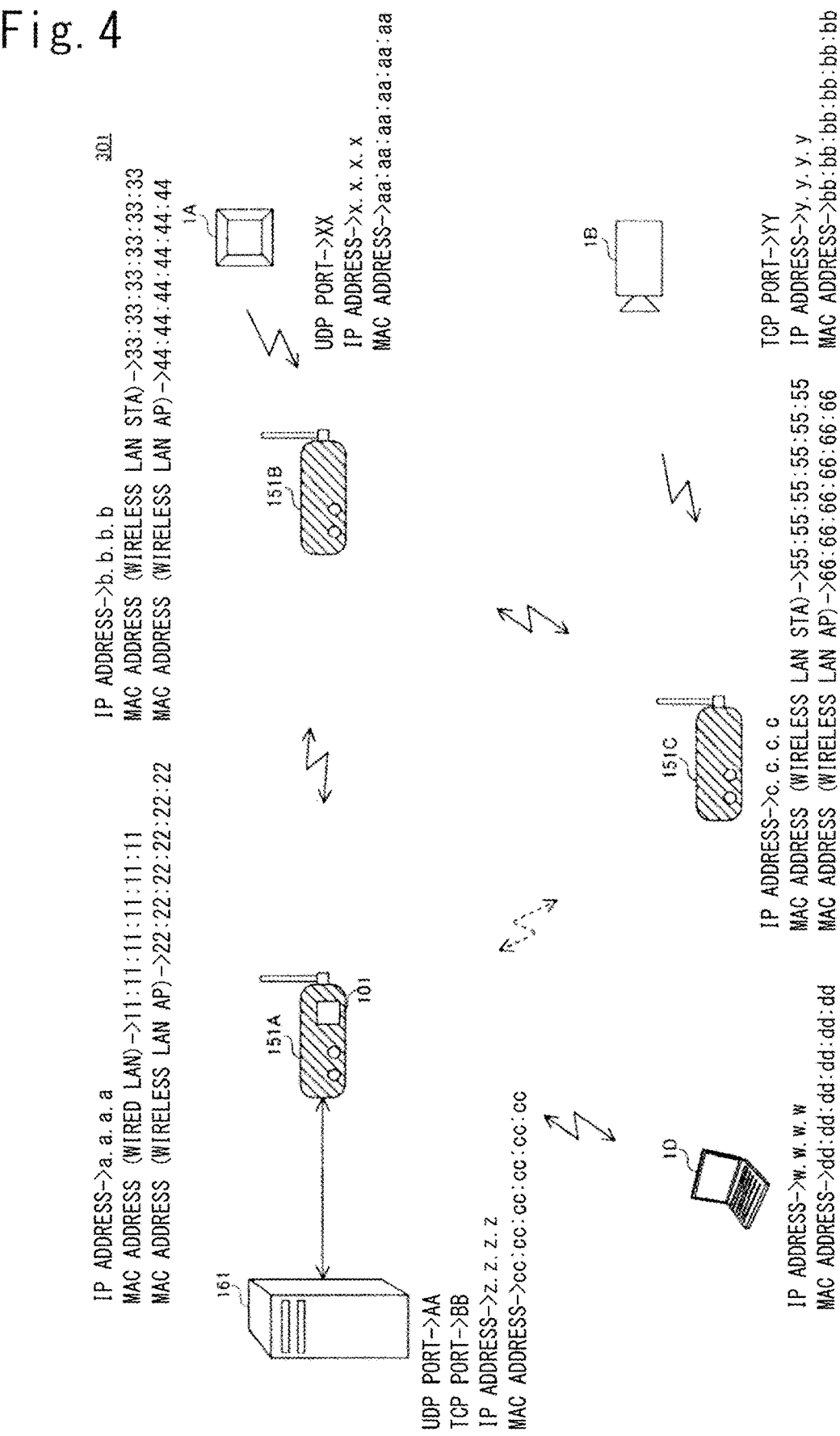
FIG. 4 is a diagram showing a specific example of the management system according to the embodiment of the present invention.

FIG. 4 is a diagram showing a specific example of the management system according to the embodiment of the present invention.

With reference to FIG. 4, the management system 301 includes: APs 151A, 151B, and 151C which are each an AP 151; and the management device 101. In this example, the management device 101 is provided inside the AP 151A.

Different from the AP 151 shown in FIG. 3, the APs 151A, 151B, and 151C are each provided with two sets of a port 46 and a physical module 45.

The AP 151 has already established communication connection with the application device 1. In this example, the AP 151A has already established communication connection with the server 161 and the application device 1D. The AP 151B has already established communication connection with the application device 1A. The AP 151C has already established communication connection with the application device 1B.

In addition, the AP 151 has already established communication connection with another AP 151. In this example, the AP 151A has already established communication connection with the AP 151B. The AP 151B has already established communication connection with the AP 151C. Although the AP 151A has not established communication connection with the AP 151C, the AP 151A can establish communication connection therewith.

Figure 5:
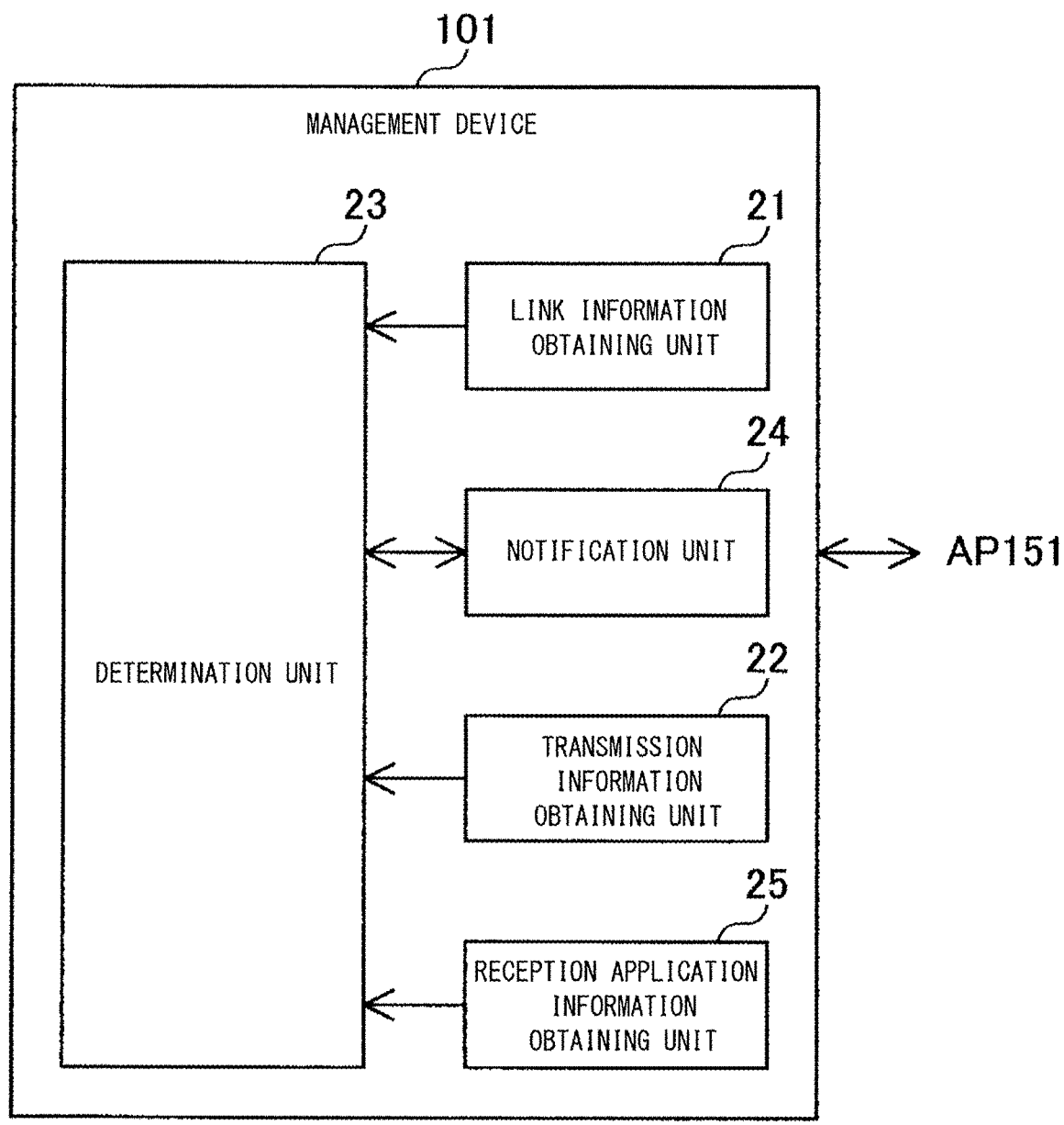
FIG. 5 is a diagram showing a configuration of a management device in the management system according to the embodiment of the present invention.

FIG. 5 is a diagram showing a configuration of the management device in the management system according to the embodiment of the present invention.

With reference to FIG. 5, the management device 101 includes a link information obtaining unit 21, a transmission information obtaining unit 22, a determination unit 23, a notification unit 24, and a reception application information obtaining unit 25.

The obtaining units 21, 22, the determination unit 23, and the notification unit 24 are each implemented by a processor which performs digital signal processing, such as a CPU or an MPU, for example. These units may be implemented as one processor, or may be implemented as separate processors.

The link information obtaining unit 21 obtains, with respect to the plurality of APs 151, link information which includes the communication connection relationship of each AP 151 and the communication quality between the APs 151. More specifically, the link information obtaining unit 21 obtains link information that includes, for example: information capable of specifying a port 46 of an AP 151; information capable of specifying an AP 151 as a connection destination via the port 46; and the kind of communication method that corresponds to the port 46.

FIG. 6 is a diagram showing one example of the link information to be registered in the management device in the management system according to the embodiment of the present invention.

With reference to FIG. 4 to FIG. 6, for example, the link information obtaining unit 21 generates, every predetermined time period, a link information request for causing each AP 151 managed by the management device 101, to transmit link information, and the link information obtaining unit 21 transmits the generated link information request to the AP 151. In this example, the link information obtaining unit 21 transmits link information requests to the APs 151A to 151C.

For example, the AP 151A has a port 46 for wired LAN having a port number 0, and a port 46 for wireless LAN AP having a port number 1. If the AP 151A receives a link information request from the management device 101, the AP 151A generates link information in accordance with the received link information request.

More specifically, the AP 151A generates link information that includes access point (AP) ID, IP address, the number of ports, and port information, of the AP 151A. Here, the port information includes port number, MAC address, port type, and information by port type. The information by port type differs depending on the port type.

The AP ID, the IP address, and the number of ports of the AP 151A are "1", "a.a.a.a", and "2", respectively. The MAC address and the port type that correspond to the port 46 having the port number 0 are "11:11:11:11:11:11" and "wired LAN", respectively.

When the port type is wired LAN, the information by port type includes: connection indicative of a communication connection destination; and communication speed with respect to the communication connection destination. Specifically, the connection and the communication speed in the information by port type are "cc:cc:cc:cc:cc:cc" which is the MAC address of the server 161, and "100 Mbps", respectively.

The MAC address and the port type that correspond to the port 46 having the port number 1 are "22:22:22:22:22:22" and "wireless LAN AP", respectively.

When the port type is wireless LAN AP, the information by port type includes: connection STA indicative of a terminal as a communication connection destination; radio wave intensity of reception radio wave; and communication speed with respect to the communication connection destination.

In this example, as the terminals for the AP 151A, the AP 151B and the application device 1D have already established communication connection therewith, and thus, there are two pieces of the information by port type that corresponds to the port 46 having the port number 1.

More specifically, the connection STA, the radio wave intensity, and the communication speed of the AP 151B are "33:33:33:33:33:33" which is the MAC address on the Station side of the AP 151B, "−50 dBm", and "54 Mbps", respectively.

The connection STA, the radio wave intensity, and the communication speed of the application device 1D are "dd:dd:dd:dd:dd:dd" which is the MAC address of the application device 1D, "−40 dBm", and "54 Mbps", respectively. The AP 151A transmits the generated link information to the management device 101.

When the link information obtaining unit 21 in the management device 101 has received the link information from the AP 151A as a response to the link information request, the link information obtaining unit 21 outputs the received link information to the determination unit 23.

When the determination unit 23 has received the link information from the link information obtaining unit 21, the determination unit 23 generates a link information table 402A collectively indicative of the received link information, and holds, i.e., registers, the generated link information table 402A.

FIG. 7 is a diagram showing one example of the link information to be registered in the management device in the management system according to the embodiment of the present invention.

With reference to FIG. 4 and FIG. 7, for example, the AP 151B has a port 46 having a port number 0, and a port 46 having a port number 1. When the AP 151B has received a link information request from the management device 101, the AP 151B generates link information in accordance with the received link information request.

In this example, the AP ID, the IP address, and the number of ports of the AP 151B which should be included in the link information are "2", "b.b.b.b", and "2", respectively. The MAC address and the port type that correspond to the port 46 having the port number 0 are "33:33:33:33:33:33" and "wireless LAN STA", respectively.

When the port type is wireless LAN STA, the information by port type includes: connection destination AP BSSID indicative of a base station as a communication connection destination; radio wave intensity of reception radio wave; communication speed with respect to the communication connection destination; and scan information indicative of candidate devices with which communication connection can be established. Specifically, the connection destination AP BSSID, the radio wave intensity, and the communication speed of the information by port type are "22:22:22:22:22:22" which is the MAC address on the AP side of the AP 151A, "−50 dBm", and "54 Mbps", respectively. Since there is no candidate device with which communication connection can be established, the scan information is "blank".

The MAC address and the port type that correspond to the port 46 having the port number 1 are "44:44:44:44:44:44" and "wireless LAN AP", respectively.

In this example, as the terminals for the AP 151B, the AP 151C and the application device 1A have already established communication connection therewith, and thus, there are two pieces of the information by port type that corresponds to the port 46 having the port number 1.

More specifically, the connection STA, the radio wave intensity, and the communication speed of the AP 151C are "55:55:55:55:55:55" which is the MAC address on the Station side of the AP 151C, "−80 dBm", and "6 Mbps", respectively.

The connection STA, the radio wave intensity, and the communication speed in the information by port type of the application device 1A are "aa:aa:aa:aa:aa:aa" which is the MAC address of the application device 1A, "−40 dBm", and "54 Mbps", respectively. The AP 151B transmits the generated link information to the management device 101.

With reference to FIG. 5 again, when the link information obtaining unit 21 in the management device 101 has received the link information from the AP 151B, the link information obtaining unit 21 outputs the received link information to the determination unit 23.

When the determination unit 23 has received the link information from the link information obtaining unit 21, the determination unit 23 generates a link information table 402B collectively indicative of the received link information, and registers the generated link information table 402B.

FIG. 8 is a diagram showing one example of the link information to be registered in the management device in the management system according to the embodiment of the present invention.

With reference to FIG. 4 and FIG. 8, for example, the AP 151C has a port 46 having a port number 0, and a port 46 having a port number 1. When the AP 151C has received a link information request from the management device 101, the AP 151C generates link information in accordance with the received link information request.

In this example, the AP ID, the IP address, and the number of ports of the AP 151C which should be included in the link information are "3", "c.c.c.c", and "2", respectively. The MAC address and the port type that correspond to the port 46 having the port number 0 are "55:55:55:55:55:55" and "wireless LAN STA", respectively.

The connection destination AP BSSID, the radio wave intensity, and the communication speed in the information by port which correspond to the port 46 having the port number 0 are "44:44:44:44:44:44" which is the MAC address on the AP side of the AP 151B, "−80 dBm", and "6 Mbps", respectively. Since the AP 151A is a candidate device as a communication connection destination, the AP BSSID and the radio wave intensity in the scan information are "22:22:22:22:22:22" and "−80 dBm", respectively.

The MAC address and the port type that correspond to the port 46 having the port number 1 are "66:66:66:66:66:66" and "wireless LAN AP".

The connection destination STA, the radio wave intensity, and the communication speed in the information by port type which correspond to the port 46 having the port number 1 are "bb:bb:bb:bb:bb:bb" which is the MAC address of the application device 1B, "−40 dBm", and "54 Mbps", respectively. The AP 151C transmits the generated link information to the management device 101.

With reference to FIG. 5 again, when the link information obtaining unit 21 in the management device 101 has received the link information from the AP 151C, the link information obtaining unit 21 outputs the received link information to the determination unit 23.

When the determination unit 23 has received the link information from the link information obtaining unit 21, the determination unit 23 generates link information table 402C collectively indicative of the received link information, and registers the generated link information table 402C.

The port type is not limited to wired LAN, wireless LAN AP, and wireless LAN STA, and may be IEEE802.15.4 and the like.

FIG. 9 is a diagram showing one example of transmission information to be registered in the management device in the management system according to the embodiment of the present invention.

With reference to FIG. 4 and FIG. 9, an administrator performs the following registration operation such that an application operating in the server 161 can receive an image captured by the application device 1B, in accordance with the TCP protocol.

That is, the administrator performs an operation for registering, in the management device 101, transmission information which includes: specification information for specifying target information; and required quality which is communication quality required for transmitting the target information. Here, the specification information includes, for example, information capable of specifying the transmission destination and the transmission source of the target information.

Specifically, the administrator performs, on the application device 1D, an operation for registering the Ethernet type, the IP protocol, the transmission-destination IP address, the transmission-source IP address, the transmission-destination TCP port number, the transmission-source TCP port number, the priority, the maximum communication speed, the minimum communication speed, and the allowable delay amount.

Here, the Ethernet type, the IP protocol, the transmission-destination IP address, the transmission-source IP address, the transmission-destination TCP port number, and the transmission-source TCP port number are examples of the specification information. The priority, the maximum communication speed, the minimum communication speed, and the allowable delay amount are examples of the required quality.

In this example, the Ethernet type, the IP protocol, the transmission-destination IP address, the transmission-source IP address, the transmission-destination TCP port number, and the transmission-source TCP port number are "0x0800", "6", "z.z.z.z", "y.y.y.y", "BB", and "YY", respectively. The priority, the maximum communication speed, the minimum communication speed, and the allowable delay amount are "1", "10 Mbps", "10 Mbps", and "200 ms", respectively.

Here, as for the priority, the greater the value is, the higher the priority is. The maximum communication speed is the speed necessary for transmitting the target information. The minimum communication speed is determined on the basis of the allowable amount of loss of the target information.

Specifically, for example, if 10 images are to be transmitted and transmission of each of the 10 images requires a communication speed of 1 Mbps, the maximum communication speed that should be set is 10 Mbps. For transmitting these 10 images without losing any of the 10 images, the minimum communication speed that should be set is 10 Mbps. If loss of five of these 10 images is allowable, the minimum communication speed that should be set is 5 Mbps.

The administrator performs, on the application device 1D, the following registration operation such that an application operating in the server 161 can receive sensor information measured in the application device 1A, in accordance with a UDP protocol.

That is, the administrator performs an operation for registering the Ethernet type, the IP protocol, the transmission-destination IP address, the transmission-source IP address, the transmission-destination UDP port number, the transmission-source UDP port number, the priority, the maximum communication speed, the minimum communication speed, and the allowable delay amount.

Here, the transmission-destination UDP port number and the transmission-source UDP port number are examples of the specification information.

In this example, the Ethernet type, the IP protocol, the transmission-destination IP address, the transmission-source IP address, the transmission-destination UDP port number, and the transmission-source UDP port number are "0x0800", "17", "z.z.z.z", "x.x.x.x", "AA", and "XX", respectively. The priority, the maximum communication speed, the minimum communication speed, and the allowable delay amount are "2", "100 kbps", "100 kbps", and "100 ms", respectively.

The application device 1D includes a reception unit such as a mouse and a keyboard. The application device 1D receives the operation performed by the administrator, generates operation information indicative of the content of the received operation, and transmits the operation information to the AP 151A.

When the AP 151A has received the operation information from the application device 1D, the AP 151A transmits the received operation information to the management device 101.

With reference to FIG. 5 again, the transmission information obtaining unit 22 in the management device 101 obtains transmission information which includes: specification information for specifying target information; and required quality which is communication quality required for transmitting the target information.

Specifically, the transmission information obtaining unit 22 receives, as the transmission information, the operation information from the AP 151A, and outputs the received transmission information to the determination unit 23.

When the determination unit 23 has received the transmission information from the transmission information obtaining unit 22, the determination unit 23 generates a transmission information table 401 (see FIG. 9) collectively indicative of the received transmission information, and registers the generated transmission information table 401.

Being triggered by, for example, having received the transmission information from the transmission information obtaining unit 22, the determination unit 23 generates instruction information based on the transmission information.

Specifically, with respect to the transmission information having the ID 2 in the transmission information table 401, the determination unit 23 specifies the AP 151 which already has established communication connection with the application device 1A serving as the transmission source.

More specifically, by use of the ARP, the determination unit 23 obtains "aa:aa:aa:aa:aa:aa" which is the MAC address of the application device 1A, from "x.x.x.x" which is the IP address of the application device 1A.

Specifically, in accordance with the ARP, the determination unit 23 broadcasts an ARP request packet which includes the IP address of the application device 1A, and receives from the application device 1A an ARP reply packet which includes the MAC address of the application device 1A and which is a response to the ARP request packet, whereby the determination unit 23 obtains "aa:aa:aa:aa:aa:aa".

Then, on the basis of the obtained MAC address and the link information table 402B (see FIG. 7), the determination unit 23 identifies that the communication connection destination of the application device 1A is the AP 151B.

The determination unit 23 generates instruction information PB which includes specification information that corresponds to the items of the ID 2 in the transmission information table 401, and outputs the generated instruction information PB to the notification unit 24, with the specified AP 151B set as the destination. Here, the specification information indicates "0x0800", "17", "z.z.z.z", "x.x.x.x", "AA", and "XX" as the Ethernet type, the IP protocol, the transmission-destination IP address, the transmission-source IP address, the transmission-destination UDP port number, and the transmission-source UDP port number, respectively.

The notification unit 24 notifies the AP 151 of the instruction information based on the transmission information obtained by the transmission information obtaining unit 22.

More specifically, when the notification unit 24 has received, from the determination unit 23, the instruction information PB having the AP 151B as the destination, the notification unit 24 transmits the received instruction information PB to the AP 151B.

Similarly, with respect to the transmission information having the ID 1 in the transmission information table 401, the determination unit 23 obtains, using the ARP, "bb:bb:bb:bb:bb:bb" which is the MAC address of the application device 1B from "y.y.y.y" which is the IP address of the application device 1B serving as the transmission source. Then, on the basis of the obtained MAC address and the link information table 402C (see FIG. 8), the determination unit 23 identifies that the communication connection destination of the application device 1B is the AP 151C.

The determination unit 23 generates instruction information PC which includes specification information that corresponds to the items of the ID 1 in the transmission information table 401, and outputs the generated instruction information PC to the notification unit 24, with the specified AP 151C set as the destination. Here, the specification information indicates "0x0800", "6", "z.z.z.z", "y.y.y.y", "BB", and "YY" as the Ethernet type, the IP protocol, the transmission-destination IP address, the transmission-source IP address, the transmission-destination TCP port number, and the transmission-source TCP port number, respectively.

When the notification unit 24 has received, from the determination unit 23, the instruction information PC having the AP 151C as the destination, the notification unit 24 transmits the received instruction information PC to the AP 151C.

With reference to FIG. 4 again, for example, by use of the instruction information, the AP 151 determines whether the information received from another device is target information.

More specifically, when the AP 151B has received the instruction information PB from the management device 101, the AP 151B waits for a MAC frame 501 from the application device 1A in accordance with the received instruction information PB.

FIG. 10 is a diagram showing one example of reception application information to be transmitted from an AP to the management device in the management system according to the embodiment of the present invention.

With reference to FIG. 10, when the AP 151B has received a MAC frame 501 from the application device 1A at the port 46 having the port number 1, the AP 151B compares the content of each header in the received MAC frame 501 with the specification information included in the instruction information PB. If the content of each header in the received MAC frame 501 and the specification information included in the instruction information PB match each other, the AP 151B determines that target information has been received. Meanwhile, if the content of each header in the received MAC frame 501 and the specification information included in the instruction information PB do not match each other, the AP 151B discards the received MAC frame 501.

When the AP 151B has determined that the target information has been received, the AP 151B generates reception application information 403B obtained by adding "2" as the AP ID of the AP 151B and "1" as the port number of the port 46 having received the target information, to the specification information included in the instruction information PB. Then, the AP 151B transmits the generated reception application information 403B to the management device 101.

Similarly, when the AP 151C has received the instruction information PC from the management device 101, the AP 151C waits for a MAC frame 501 from the application device 1B in accordance with the received instruction information PC.

FIG. 11 is a diagram showing one example of the reception application information to be transmitted from an AP to the management device in the management system according to the embodiment of the present invention.

With reference to FIG. 11, when the AP 151C has received a MAC frame 501 from the application device 1B at the port 46 having the port number 1, the AP 151C compares the content of each header in the received MAC frame 501 with the specification information included in the instruction information PC. If the content of each header in the received MAC frame 501 and the specification information included in the instruction information PC match each other, the AP 151C determines that target information has been received. Meanwhile, if the content of each header in the received MAC frame 501 and the specification information included in the instruction information PC do not match each other, the AP 151C discards the received MAC frame 501.

When the AP 1510 has determined that the target information has been received, the AP 151C generates reception application information 403C obtained by adding "3" as the AP ID of the AP 151C and "1" as the port number of the port 46 having received the target information, to the specification information included in the instruction information PC. Then, the AP 151C transmits the generated reception application information 403C to the management device 101.

With reference to FIG. 5 again, when the reception application information obtaining unit 25 has received the reception application information 403B from the AP 151B, the reception application information obtaining unit 25 outputs the received reception application information 403B to the determination unit 23. When the reception application information obtaining unit 25 has received the reception application information 403C from the AP 151C, the reception application information obtaining unit 25 outputs the received reception application information 403C to the determination unit 23.

The determination unit 23 performs a path determination process for searching for a transmission path formed by APs 151 and capable of transmitting the target information while satisfying the required quality, on the basis of the link information obtained by the link information obtaining unit 21 and the transmission information obtained by the transmission information obtaining unit 22.

More specifically, for example, on the basis of the link information and the transmission information, the determination unit 23 determines whether or not a transmission path formed by APs 151 and capable of transmitting the target information while satisfying the required quality exists. Not limited to the configuration in which the determination unit 23 performs binary determination of whether or not the above-described transmission path exists, a configuration may be employed in which the determination unit 23 performs determination of probability or the like regarding the existence of such a transmission path, other than the binary determination.

For example, if the determination unit 23 is notified by an AP 151 that the target information has been received, the determination unit 23 performs the path determination process.

Specifically, when the determination unit 23 has received the reception application information 403B or the reception application information 403C from the reception application information obtaining unit 25, the determination unit 23 performs the path determination process regarding the received reception application information.

In an example in which the transmission path exists, for example, if the determination unit 23 receives the reception application information 403B from the reception application information obtaining unit 25, the determination unit 23 recognizes that the AP 151B has received the target information that corresponds to the items of the ID 2 in the transmission information table 401 (see FIG. 9), on the basis of the received reception application information 403B.

By use of the ARP, the determination unit 23 obtains "cc:cc:cc:cc:cc:cc" which is the MAC address of the server 161 from "z.z.z.z" which is the IP address of the server 161 as the transmission destination. Then, on the basis of the obtained MAC address and the link information table 402A (see FIG. 6), the determination unit 23 identifies that the communication connection destination of the server 161 is the AP 151A.

On the basis of the link information tables 402A, 402B, the determination unit 23 recognizes that the AP 151A and the AP 151B establish communication connection with each other and that communication quality having a communication speed of 54 Mbps and having a radio wave intensity of −50 dBm can be ensured.

The determination unit 23 determines that a transmission path satisfying the required quality exists because the maximum communication speed and the minimum communication speed in the transmission information of the ID 2 in the transmission information table 401 are each 100 kbps.

FIG. 12 and FIG. 13 are each a diagram showing one example of control information to be transmitted from the management device to an AP in the management system according to the embodiment of the present invention.

With reference to FIG. 12 and FIG. 13, when the determination unit 23 has determined that the transmission path exists, the determination unit 23 generates control information 404B and 404A on the basis of the link information and the transmission information.

More specifically, on the basis of the link information table 402B (see FIG. 7), the determination unit 23 recognizes that the AP 151B should transmit the target information received from the application device 1A at the port 46 having the port number 1, to the AP 151A from the port 46 having the port number 0.

Then, the determination unit 23 generates "Rewrite the transmission-source MAC address of the received packet to 33:33:33:33:33:33.", "Rewrite the transmission-destination MAC address of the received packet to 22:22:22:22:22:22.", and "Transmit the rewritten packet from the port having the port number 0.", as the processing content for the switch unit 44 in the AP 151B.

The determination unit 23 generates control information 404B which includes the ID of the AP 151B, the specification information of the target information, and the generated switch processing content.

On the basis of the link information table 402A (see FIG. 6), the determination unit 23 recognizes that the AP 151A should transmit the target information received from the AP 151B at the port 46 having the port number 1, to the server 161 from the port 46 having the port number 0.

Then, the determination unit 23 generates "Rewrite the transmission-source MAC address of the received packet to 11:11:11:11:11:11.", "Rewrite the transmission-destination MAC address of the received packet to cc:cc:cc:cc:cc:cc.", "Transmit the rewritten packet from the port having the port number 0.", as the processing content for the switch unit 44 in the AP 151A.

The determination unit 23 generates control information 404A which includes the ID of the AP 151A, the specification information of the target information, and the generated switch processing content.

The determination unit 23 outputs the control information 404A to the notification unit 24, with the AP 151A, which is close to the end point of the transmission path, set as the destination.

For example, when the determination unit 23 has determined that a transmission path exists, the notification unit 24 notifies each of the APs 151 that form the transmission path, of an AP 151 that should be used as the next transmission destination for the target information, in an order reverse to the order in which the target information is to be transmitted in the transmission path. The notification unit 24 makes a notification of the port from which the target information should be outputted, for example.

More specifically, when the notification unit 24 has received, from the determination unit 23, the control information 404A having the AP 151A as the destination, the notification unit 24 transmits the received control information 404A to the AP 151A. When the notification unit 24 has received, from the AP 151A, an ACK which is a response to the control information 404A, the notification unit 24 notifies the determination unit 23 that the ACK has been received.

When the determination unit 23 has received, from the notification unit 24, the notification indicating that the ACK has been received, the determination unit 23 recognizes that the transmission of the control information 404A has been completed. Then, the determination unit 23 outputs the control information 404B to the notification unit 24, with the AP 151B set as the destination, wherein the AP 151B is the second closest to the end point of the transmission path after the AP 151A.

When the notification unit 24 has received, from the determination unit 23, the control information 404B having the AP 151B as the destination, the notification unit 24 transmits the received control information 404B to the AP 151B. When the notification unit 24 has received, from the AP 151B, an ACK which is a response to the control information 404B, the notification unit 24 notifies the determination unit 23 that the ACK has been received.

When the determination unit 23 has received, from the notification unit 24, the notification indicating that the ACK has been received, the determination unit 23 recognizes that the transmission of the control information 404B has been completed.

With reference to FIG. 3 again, when the information obtaining units 41 in the APs 151A, 151B have respectively received the control information 404A, 404B from the management device 101, the information obtaining units 41 output the received control information 404A, 404B to the control units 42, respectively.

When the control unit 42 in the AP 151A has received the control information 404A from the information obtaining unit 41, the control unit 42 in the AP 151A rewrites the path table that corresponds to the specification information included in the control information 404A, among the path tables held by the path table holding unit 43, to the content of the received control information 404A.

When the control unit 42 in the AP 151B has received the control information 404B from the information obtaining unit 41, the control unit 42 in the AP 151B rewrites the path table that corresponds to the specification information included in the control information 404B, among the path tables held by the path table holding unit 43, to the content of the received control information 404B.

With reference to FIG. 5 again, in an example in which the transmission path does not exist, for example, if the determination unit 23 receives the reception application information 403C (see FIG. 11) from the reception application information obtaining unit 25, the determination unit 23 performs the path determination process regarding the received reception application information 403C.

More specifically, on the basis of the reception application information 403C, the determination unit 23 recognizes that the AP 151C has received the target information that corresponds to the items of the ID 1 in the transmission information table 401.

As described above, by use of the ARP, the determination unit 23 identifies that the communication connection destination of the server 161 as the transmission destination is the AP 151A, and on the basis of the link information tables 402A, 402B, the determination unit 23 recognizes that the AP 151A and the AP 151B establish communication connection with each other and that communication quality having a communication speed of 54 Mbps and having a radio wave intensity of −50 dBm can be ensured.

In addition, on the basis of the link information tables 402B, 402C, the determination unit 23 recognizes that the AP 151B and the AP 151C establish communication connection with each other and communication quality having a communication speed of 6 Mbps and having a radio wave intensity of −80 dBm can be ensured.

The determination unit 23 determines that the transmission path satisfying the required quality does not exist because the maximum communication speed and the minimum communication speed in the transmission information of the ID 1 in the transmission information table 401 are each 10 Mbps.

FIG. 14 is a diagram showing one example of report information generated by the determination unit in the management device according to the embodiment of the present invention.

With reference to FIG. 14, the determination unit 23 generates report information 405 indicative of a determination result regarding the transmission path.

More specifically, the determination unit 23 generates the report information 405 indicative of a determination result regarding the transmission path for each ID in the transmission information table 401.

Specifically, since the determination unit 23 has determined that the transmission path satisfying the required quality does not exist with respect to the transmission information of the ID 1 in the transmission information table 401, the determination unit 23 generates the report information 405 so as to allow recognition of the fact that the transmission path does not exist. More specifically, the determination unit 23 generates the report information 405 that includes "cause" and "countermeasure" which are examples of the content regarding the space between APs 151 that does not satisfy the required quality.

Specifically, since the actual communication speed between the AP 151B and the AP 151C is 6 Mbps while the required communication speed is 10 Mbps, the determination unit 23 writes, in the report information 405, "abnormal" and "insufficient communication band" as items that respectively correspond to "state" and "cause".

In addition, since the radio wave intensity in the communication between the AP 151B and the AP 151C is as weak as −80 dBm as shown in the link information tables 402B, 402C, and since the radio wave intensity in the result of scanning the radio wave from the AP 151A performed by the AP 151C is as weak as −80 dBm as shown in the link information table 402C, the determination unit 23 performs the following process.

That is, the determination unit 23 recognizes that the quality in the communication band can be improved to the required quality by increasing the radio wave intensity, and determines that the number of APs 151 should be increased.

The determination unit 23 determines that the space between the AP 151A and the AP 151C where the number of APs 151 that perform relaying can be smaller than in a case where an AP 151 is newly provided between the AP 151B and the AP 151C is suitable as the position for newly providing an AP 151.

As the item that corresponds to "countermeasure", the determination unit 23 writes in the report information 405, "Provide a new AP 151A between the AP 151A (AP ID=1) and the AP 151C (AP ID=3)" which summarizes these determination results.

Since the determination unit 23 has determined that the transmission path satisfying the required quality exists with respect to the transmission information of the ID 2 in the transmission information table 401, the determination unit 23 writes, in the report information 405, "normal" as an item corresponding to the "state".

The determination unit 23 outputs the report information 405 to the notification unit 24, with the application device 1D set as the destination.

When the determination unit 23 has determined that the transmission path does not exist, for example, the notification unit 24 makes a notification so as to allow recognition of the fact that the transmission path does not exist. More specifically, the notification unit 24 makes a notification regarding the space between APs 151 that does not satisfy the required quality, for example.

Specifically, when the notification unit 24 receives, from the determination unit 23, the report information 405 having the application device 1D as the destination, the notification unit 24 transmits the received report information 405 to the application device 1D via the AP 151A.

With reference to FIG. 4 again, when the application device 1D has received the report information 405 from the management device 101, the application device 1D displays the content of the received report information 405 on a screen.

From the content displayed on the screen of the application device 1D, the administrator can easily identify the existence of the transmission path that does not satisfy the required quality and the cause thereof.

[Operation]

Each device in the management system 301 includes a computer, and an arithmetic processing unit such as a CPU in the computer reads out a program including part or all of steps in the sequence diagram or flow chart described below from a memory (not shown), and executes the program. The programs for the plurality of devices can be installed from outside. The programs for the plurality of devices are each distributed in a state of being stored in a storage medium.

Figure 15:
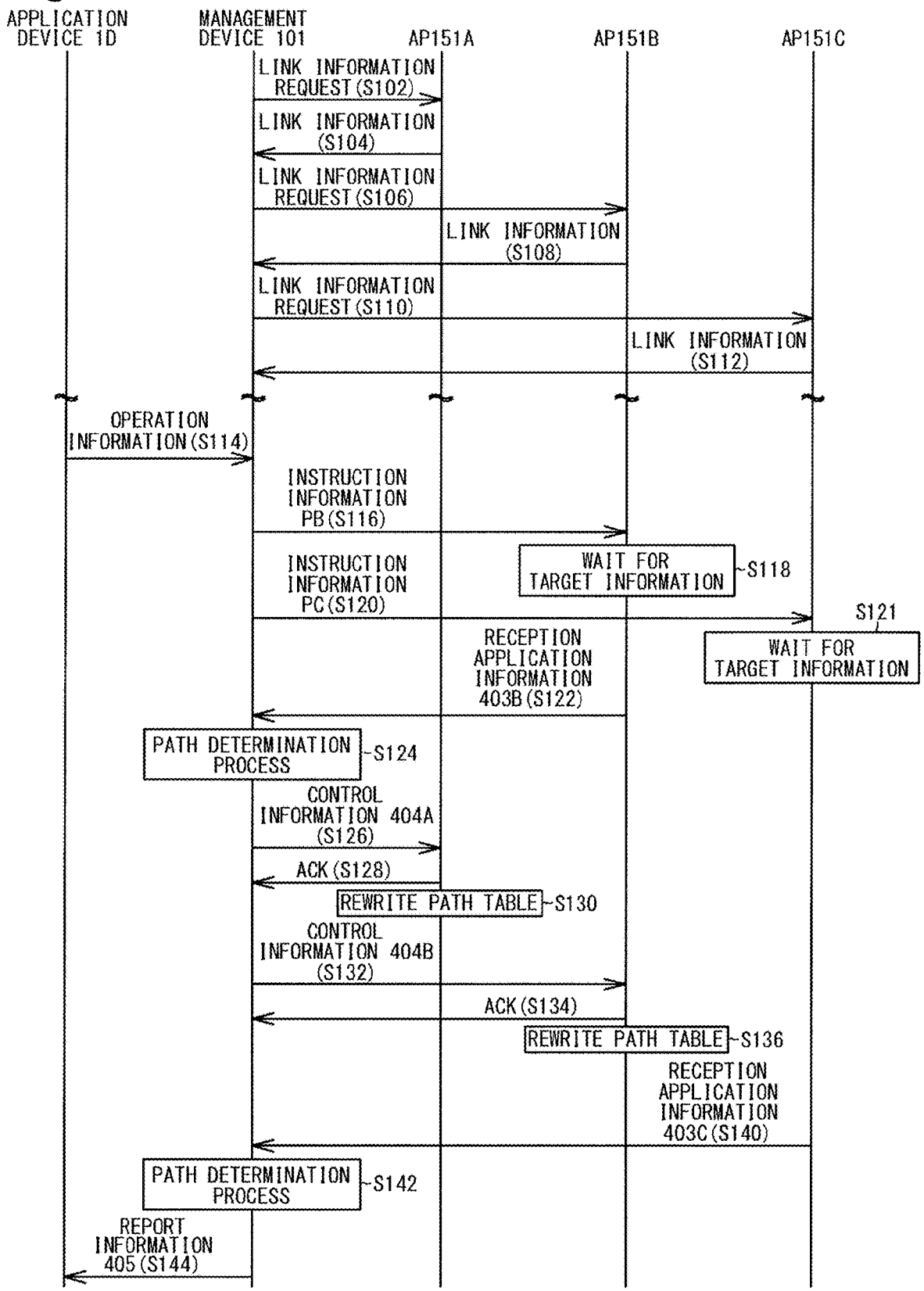
FIG. 15 is a diagram showing one example of the sequence followed when transmission path determination is performed in the management system according to the embodiment of the present invention.

FIG. 15 is a diagram showing one example of the sequence followed when transmission path determination is performed in the management system according to the embodiment of the present invention.

With reference to FIG. 15, first, the management device 101 transmits a link information request to the AP 151A (step S102).

Next, when the AP 151A has received the link information request from the management device 101, the AP 151A generates link information in accordance with the received link information request, and transmits the generated link information to the management device 101 (step S104).

Next, the management device 101 transmits a link information request to the AP 151B (step S106).

Next, when the AP 151B has received the link information request from the management device 101, the AP 151B generates link information in accordance with the received link information request, and transmits the generated link information to the management device 101 (step S108).

Next, the management device 101 transmits a link information request to the AP 151C (step S110).

Next, when the AP 151C has received the link information request from the management device 101, the AP 151C generates link information in accordance with the received link information request, and transmits the generated link information to the management device 101 (step S112).

The processes of steps S102 to S112 are periodically or non-periodically repeated.

Next, the application device 1D transmits, to the management device 101, operation information indicative of the content of an operation performed by the administrator for registering transmission information into the management device 101 (step S114).

Next, the management device 101 receives the operation information from the application device 1D as transmission information, generates instruction information PB on the basis of the received transmission information, and transmits the generated instruction information PB to the AP 151B (step S116).

Next, when the AP 151B has received the instruction information from the management device 101, the AP 151B waits for target information in accordance with the received instruction information (step S118).

Next, the management device 101 generates instruction information PC on the basis of the transmission information, and transmits the generated instruction information PC to the AP 151C (step S120).

Next, when the AP 151C has received the instruction information from the management device 101, the AP 151C waits for target information in accordance with the received instruction information (step S121).

Next, when the AP 151B has received target information from the application device 1A, the AP 151B generates reception application information 403B and transmits the generated reception application information 403B to the management device 101 (step S122).

Next, the management device 101 receives the reception application information 403B from the AP 151B, performs a path determination process with respect to the reception application information 403B by being triggered by the reception of the reception application information 403B, determines that a transmission path satisfying the required quality exists, and generates control information 404A and 404B (step S124).

Next, the management device 101 transmits the generated control information 404A to the AP 151A (step S126).

Next, when the AP 151A has received the control information 404A from the management device 101, the AP 151A transmits an ACK as a response indicating the reception of the control information 404A, to the management device 101 (step S128).

Next, the AP 151A rewrites a path table in accordance with the received control information 404A (step S130).

Next, when the management device 101 has received the ACK from the AP 151A, the management device 101 transmits the generated control information 404B to the AP 151B (step S132).

Next, when the AP 151B has received the control information 404B from the management device 101, the AP 151B transmits an ACK as a response indicating the reception of the control information 404B, to the management device 101 (step S134).

Next, the AP 151B rewrites a path table in accordance with the received control information 404B (step S136).

Next, when the AP 151C has received target information from the application device 1B, the AP 151C generates reception application information 403C, and transmits the generated reception application information 403C to the management device 101 (step S140).

Next, the management device 101 receives the reception application information 403C from the AP 151C, performs a path determination process with respect to the reception application information 403C by being triggered by the reception of the reception application information 403C, and determines that a transmission path satisfying the required quality does not exist (step S142).

Next, the management device 101 generates report information 405 indicative of the result of each path determination process, and transmits the generated report information 405 to the application device 1D (step S144).

The order of steps S102, S104, steps S106, S108, and steps S110, S112 is not limited to the order shown above, and part or the entire order may be changed.

The order of steps S116, S118 and steps S120, S121 is not limited to the order shown above, and the order may be switched with each other.

The order of step S128 and step S130 is not limited to the order shown above, and the order may be switched with each other.

The order of step S134 and step S136 is not limited to the order shown above, and the order may be switched with each other.

The AP 151 is configured to transmit link information in response to a link information request received from the management device 101, but the configuration is not limited thereto. The AP 151 may be configured to spontaneously transmit link information periodically or non-periodically to the management device 101.

In the management system according to the embodiment of the present invention, the link information includes, but is not limited to: information capable of specifying a port 46 of an AP 151; information capable of specifying an AP 151 as a connection destination via the port 46; and the kind of communication method that corresponds to the port 46. The link information may include: information capable of specifying a port 46 of an AP 151; and information capable of specifying an AP 151 as a connection destination via the port 46, or may include the kind of communication method that corresponds to a port 46.

In the management device according to the embodiment of the present invention, the determination unit 23 is configured to perform a path determination process by being triggered by reception of notification from an AP 151 to the effect that target information has been received. However, the configuration is not limited thereto. The determination unit 23 may be configured to perform a path determination process by being triggered by reception of transmission information from the transmission information obtaining unit 22.

In the management system according to the embodiment of the present invention, each communication device is configured to perform wireless communication, but the configuration is not limited thereto. Each communication device may be configured to perform wired communication.

The management device according to the embodiment of the present invention is configured to include the notification unit 24, but the configuration is not limited thereto. The management device 101 may be configured so as not to include the notification unit 24.

In a specific example, the management system 301 according to the embodiment of the present invention is configured to include three APs 151, but the configuration is not limited thereto. The management system 301 may be configured to include two APs 151. In such a configuration, it is not possible to select a transmission path, but it is possible to determine whether the transmission path satisfies the required quality. Therefore, when it has been determined that the communication quality required by an application cannot be ensured, it is possible to take measures that can ensure the required quality. That is, it is possible to achieve the object of the present invention that good communication quality can be more reliably ensured in a configuration in which information is transmitted via a plurality of communication devices.

Meanwhile, in a case where a packet is sent/received to/from communication devices via a wireless ad hoc network, the packet is transmitted among communication devices though a transmission path via one or a plurality of wireless terminal devices which relay the packet.

Such multi-hop communication is used not only in a wireless ad hoc network but also in a wired network, and is often used by a single application such as a smart meter for measuring electric power, for example.

In contrast to this, an M2M (machine to machine) system expected to be increasingly used in the future is realized in a combination of various applications having different required communication qualities such as in: transmission of high frequency waves such as sound, vibration, voltage, current, and magnetic field; delivery of images and moving pictures; transmission and analysis of bulk data accumulated in the past; and real-time control.

In a case where various applications, such as in an M2M system, uses multi-hop communication, the communication quality required by the applications is not ensured in some cases due to traffic concentration. In such a case, communication by the applications is not realized in good quality, which is not preferable. There is a demand for a technology that more reliably ensures the communication quality required by each application, by managing each communication device.

Meanwhile, in the management device according to the embodiment of the present invention, with respect to a plurality of APs 151 capable of relaying information and capable of establishing communication connection with each other, the link information obtaining unit 21 obtains link information which includes the communication connection relationship of each AP 151 and the communication quality between the APs 151. The transmission information obtaining unit 22 obtains transmission information which includes: specification information for specifying target information; and required quality which is communication quality required for transmitting the target information. Then, the determination unit 23 searches for a transmission path formed by APs 151 and capable of transmitting target information while satisfying the required quality, on the basis of the link information obtained by the link information obtaining unit 21 and the transmission information obtained by the transmission information obtaining unit 22.

With this configuration, since the connection state of each AP 151 can be properly recognized on the basis of the link information, a transmission path that allows more reliable transmission of the target information can be properly searched for. Accordingly, when it has been determined that the communication quality required by an application can be ensured, the target information can be transmitted in good quality by use of the transmission path, and when it has been determined that the communication quality required by the application cannot be ensured, it is possible to take measures that can ensure the communication quality required by the application. Thus, in a configuration in which information is transmitted via a plurality of communication devices, good communication quality can be more reliably ensured.

In the management device according to the embodiment of the present invention, when the determination unit 23 has determined that a transmission path exists, the notification unit 24 notifies each AP 151 forming the transmission path of an AP 151 that should be used as the next transmission destination for the target information.

With this configuration, the next transmission destination for the target information can be set in each AP 151, and thus, the target information can be transmitted along the transmission path determined by the management device 101.

In the management device according to the embodiment of the present invention, the notification unit 24 sends notification to each AP 151 in an order reverse to the order in which the target information is to be transmitted in the transmission path.

With this configuration, in the AP 151 that is to serve as the transmission destination for the target information with respect to the AP 151 that has received the notification, the setting as the transmission destination has already been made. Thus, the target information transmitted by the AP 151 that has received the notification can be prevented from being delayed at the AP 151 serving as the transmission destination for the target information. That is, the target information can be smoothly transmitted along the transmission path.

In the management device according to the embodiment of the present invention, when the determination unit 23 has determined that the transmission path does not exist, the notification unit 24 makes a notification so as to allow recognition of the fact that the transmission path does not exist.

With this configuration, for example, the administrator can recognize that the transmission path does not exist, and thus, can take measures that can ensure the communication quality required by the application.

Here, in a case where a communication failure has occurred in the transmission path formed by APs 151, it is difficult to know where the problem is in the complicated communication path.

Meanwhile, in the management device according to the embodiment of the present invention, the notification unit 24 makes a notification regarding the space between APs 151 that does not satisfy the required quality.

With this configuration, for example, the administrator can easily identify the position at which to take measures that can ensure the communication quality required by an application.

In the management device according to the embodiment of the present invention, the specification information includes information capable of specifying the transmission destination and the transmission source of the target information.

With this configuration, among the APs 151, the AP 151 that receives the target information first and the AP 151 that transmits the target information last can be specified. Thus, on the basis of the specified APs 151, the transmission path can be appropriately searched for.

In the management device according to the embodiment of the present invention, the link information includes: information capable of specifying a port 46 of an AP 151, and information capable of specifying an AP 151 as a connection destination via the port 46. Then, the notification unit 24 makes a notification of the port 46 from which the target information should be outputted.

With this configuration, it is possible to specify the port 46 of which connection destination is the AP 151 that should be used as the next transmission destination for the target information. Thus, by notifying the specified port 46, the next transmission destination for the target information can be set in a simple manner. Since the next transmission destination for information other than the target information is not set in each AP 151, information other than the target information can be prevented from being transmitted. Accordingly, security in the transmission system formed by the APs 151 can be improved.

In the management device according to the embodiment of the present invention, the link information includes the kind of communication method that corresponds to a port 46.

With this configuration, a port 46 having a communication method suitable for transmitting the target information can be specified, and thus, a more suitable transmission path can be searched for.

In the management device according to the embodiment of the present invention, the notification unit 24 notifies an AP 151 of instruction information based on transmission information obtained by the transmission information obtaining unit 22. By use of the instruction information, the AP 151 determines whether the information received from another device is the target information. Then, if the determination unit 23 is notified by the AP 151 that the target information has been received, the determination unit 23 searches for a transmission path.

With this configuration, the search for the transmission path can be performed at a suitable timing when the target information has been transmitted. Thus, compared with a case where the search for the transmission path is performed in a state where whether to perform transmission of the target information is uncertain before the transmission of the target information is performed, or in a state where the communication connection relationship of each AP 151 changes, the possibility of wasting the searching process can be reduced.

In the management system according to the embodiment of the present invention, the plurality of APs 151 can relay information and can establish communication connection with each other. With respect to the plurality of APs 151, the management device 101 obtains link information which includes the communication connection relationship of each AP 151 and the communication quality between the APs 151. The management device 101 obtains transmission information which includes: specification information for specifying target information; and required quality which is communication quality required for transmitting the target information. Then, the management device 101 searches for a transmission path formed by APs 151 and capable of transmitting target information while satisfying the required quality, on the basis of the obtained link information and transmission information.

With this configuration, since the connection state of each AP 151 can be properly recognized on the basis of the link information, a transmission path that allows more reliable transmission of the target information can be properly searched for. Accordingly, when it has been determined that the communication quality required by an application can be ensured, the target information can be transmitted in good quality by use of the transmission path, and when it has been determined that the communication quality required by the application cannot be ensured, it is possible to take measures that can ensure the communication quality required by the application. Thus, in a configuration in which information is transmitted via a plurality of communication devices, good communication quality can be more reliably ensured.

It should be understood that the above embodiment is merely illustrative and not restrictive in all aspects. The scope of the present invention is defined by the scope of the claims rather than the above description, and is intended to include meaning equivalent to the scope of the claims and all modifications within the scope.

The above description includes the features in the additional note below.

[Additional Note 1]

A management device comprising:

a link information obtaining unit configured to, with respect to a plurality of communication devices capable of relaying information and capable of establishing communication connection with each other, obtain link information including communication connection relationship of each communication device and communication quality between the communication devices;

a transmission information obtaining unit configured to obtain transmission information including specification information for specifying target information and required quality which is communication quality required for transmitting the target information; and a determination unit configured to search for a transmission path formed by the communication devices and capable of transmitting the target information while satisfying the required quality, on the basis of the link information obtained by the link information obtaining unit and the transmission information obtained by the transmission information obtaining unit, wherein each communication device includes one or a plurality of ports, each port has a MAC (media access control) address corresponding thereto, the communication connection relationship can be specified by a number of the port, the MAC address corresponding to the port, and a MAC address of a communication device as a connection destination via the port, the communication quality is an intensity of a reception radio wave and a communication speed, the specification information is an Ethernet type, an IP (Internet protocol) protocol, a transmission-destination IP address, a transmission-source IP address, a transmission-destination TCP (transmission control protocol) port number, a transmission-source TCP port number, a transmission-destination UDP (user datagram protocol) port number, or a transmission-source UDP port number, and the required quality is a priority, a maximum communication speed, a minimum communication speed, or an allowable delay amount.

[Additional Note 2]

A management system comprising:

a plurality of communication devices capable of relaying information and capable of establishing communication connection with each other; and a management device, wherein with respect to the plurality of communication devices, the management device obtains link information including communication connection relationship of each communication device and communication quality between the communication devices, the management device obtains transmission information including specification information for specifying target information and required quality which is communication quality required for transmitting the target information, the management device searches for a transmission path formed by the communication devices and capable of transmitting the target information while satisfying the required quality, on the basis of the link information and the transmission information that have been obtained, each communication device includes one or a plurality of ports, each port has a MAC (media access control) address corresponding thereto, the communication connection relationship can be specified by a number of the port, the MAC address corresponding to the port, and a MAC address of a communication device as a connection destination via the port, the communication quality is an intensity of a reception radio wave and a communication speed, the specification information is an Ethernet type, an IP (Internet protocol) protocol, a transmission-destination IP address, a transmission-source IP address, a transmission-destination TCP (transmission control protocol) port number, a transmission-source TCP port number, a transmission-destination UDP (user datagram protocol) port number, or a transmission-source UDP port number, and the required quality is a priority, a maximum communication speed, a minimum communication speed, or an allowable delay amount.

REFERENCE SIGNS LIST 1 application device
21 link information obtaining unit
22 transmission information obtaining unit
23 determination unit
24 notification unit
25 reception application information obtaining unit
41 information obtaining unit
42 control unit
43 path table holding unit
44 switch unit
45 physical module
46 port
101 management device
151 access point (AP)
161 server
301 management system

The invention claimed is:

1. A management device comprising:
a link information obtaining unit configured to, with respect to a plurality of communication devices capable of relaying information and capable of establishing communication connection with each other, obtain link information including communication connection relationship of each communication device and communication quality between the communication devices, the communication connection relationship and the communication quality being measured by the communication devices;
a transmission information obtaining unit configured to obtain transmission information including specification information for specifying target information and required quality which is communication quality required for transmitting the target information; and
a determination unit configured to search for a transmission path formed by the communication devices in which the measured communication quality satisfies the required quality, on the basis of the link information obtained by the link information obtaining unit and the transmission information obtained by the transmission information obtaining unit, wherein
the specification information includes information capable of specifying a transmission destination and a transmission source for the target information,
the determination unit specifies a transmission destination side device that is the communication device as a communication connection destination of the transmission destination and a transmission source side device that is the communication device as a communication connection destination of the transmission source, on the basis of the link information and the specification information,
the determination unit searches for the transmission path including the transmission destination side device and the transmission source side device that have been specified, on the basis of the link information and the required quality,
the management device further comprising:
a notification unit configured to, when the determination unit has determined that the transmission path exists, notify the communication devices forming the transmission path of a communication device that should be used as a next transmission destination for the target information, wherein
the notification unit notifies the communication devices in an order reverse to an order in which the target information is to be transmitted in the transmission path.

2. The management device according to claim 1, further comprising
a notification unit configured to, when the determination unit has determined that the transmission path does not exist, make a notification to a communication terminal of an administrator of the fact that the transmission path does not exist.

3. The management device according to claim 2, wherein
the notification unit makes a notification regarding a space between the communication devices that does not satisfy the required quality.

4. The management device according to claim 1, wherein
the link information includes: information capable of specifying a port of a communication device; and information capable of specifying a communication device as a connection destination via the port, and
the notification unit makes a notification of the port from which the target information should be outputted.

5. The management device according to claim 4, wherein
the link information further includes the kind of communication method that corresponds to the port.

6. The management device according to claim 1, further comprising
a notification unit configured to notify each communication device of instruction information based on the transmission information obtained by the transmission information obtaining unit, wherein
the communication device determines, by use of the instruction information, whether information received from another device is the target information, and
when the determination unit has been notified by the communication device that the target information had been received, the determination unit searches for the transmission path.

7. A management system comprising:
a plurality of communication devices capable of relaying information and capable of establishing communication connection with each other; and
a management device, wherein
with respect to the plurality of communication devices, the management device obtains link information including communication connection relationship of each communication device and communication quality between the communication devices, the communication connection relationship and the communication quality being measured by the communication devices,
the management device obtains transmission information including specification information for specifying target information and required quality which is communication quality required for transmitting the target information, and
the management device searches for a transmission path formed by the communication devices in which the measured communication quality satisfies the required quality, on the basis of the link information and the transmission information that have been obtained, wherein the specification information includes information capable of specifying a transmission destination and a transmission source for the target information, the management device specifies a transmission destination side device that is the communication device as a communication connection destination of the transmission destination and a transmission source side device that is the communication device as a communication connection destination of the transmission source, on the basis of the link information and the specification information, the management device searches for the transmission path including the transmission destination side device and the transmission source side device that have been specified, on the basis of the link information and the required quality, the management device comprising:

a notification unit configured to, when the management device has determined that the transmission path exists, notify the communication devices forming the transmission path of a communication device that should be used as a next transmission destination for the target information, wherein the notification unit notifies the communication devices in an order reverse to an order in which the target information is to be transmitted in the transmission path.

8. The management device according to claim 1, wherein the required quality is a priority, a maximum communication speed, a minimum communication speed, or an allowable delay amount.

* * * * *